United States Patent [19]

Jordan, Jr.

[11] Patent Number: 4,571,415

[45] Date of Patent: Feb. 18, 1986

[54] WASHOUT RESISTANT COATINGS

[75] Inventor: Arthur D. Jordan, Jr., Philadelphia, Pa.

[73] Assignee: Rohm and Haas Company, Philadelphia, Pa.

[21] Appl. No.: 656,198

[22] Filed: Oct. 1, 1984

[51] Int. Cl.$^4$ ................................................ C08K 3/28
[52] U.S. Cl. ..................................... 524/428; 524/395
[58] Field of Search ................................ 524/428, 395

[56] References Cited

U.S. PATENT DOCUMENTS

| | | | |
|---|---|---|---|
| 3,706,595 | 12/1972 | Drelich et al. | 524/428 |
| 3,720,562 | 3/1973 | Drelich | 524/428 |
| 3,845,066 | 10/1974 | Vasta | 524/428 |
| 3,865,775 | 2/1975 | Drelich et al. | 524/428 |

*Primary Examiner*—Paul R. Michl
*Assistant Examiner*—Alex H. Walker
*Attorney, Agent, or Firm*—Alex R. Sluzas; Douglas E. Winters

[57] ABSTRACT

This invention relates to water-based coatings and caulking compositions for exterior surfaces which upon application quickly develop resistance to being washed out by inadvertant precipitation. These compositions comprise an aqueous dispersion of water-insoluble latex polymer prepared by emulsion polymerization, inorganic pigment dispersed with anionic polymer, and water-soluble salt of a multivalent complex ion having labile, volatile ligands such as zinc ammonium complex ion.

11 Claims, No Drawings

WASHOUT RESISTANT COATINGS

BACKGROUND OF THE INVENTION

1. Field of Invention

This invention relates to water-based coatings and caulking compositions for exterior surfaces which upon application quickly develop resistance to being washed out by inadvertent precipitation. These compositions comprise an aqueous dispersion of water-insoluble latex polymer prepared by emulsion polymerization, inorganic pigment dispersed with anionic polymer, and water-soluble salt of a multivalent complex ion having labile, volatile ligands, such as zinc ammonium complex ion.

This invention relates to water-based coatings and caulking compositions for exterior surfaces. Exterior coatings are exposed to the vicissitudes of weather from the very moment they are applied to protect an exterior surface. Water-based coatings are favored over solvent-borne coatings for a number of well known reasons. They offer ease of application, reduced toxic solvent emission, lower raw material and application costs, and easy cleanup of site and equipment. However, water-based coatings are particularly vulnerable to water damage during and immediately after application. A sudden summer shower can wash away or otherwise damage the result of many hours of labor and waste valuable materials.

2. Brief Description of the Prior Art

Exterior water-based coatings may be formulated using aqueous dispersions of water-insoluble polymer latex as binders. After application, the aqueous carrier evaporates, and the individual latex particles coalesce to form an integral film. Some applications require relatively thick coating films. For example, coatings for formed-in-place polyurethane foam which is used to thermally insulate and protect institutional, commercial and industrial roofs, are relatively thick, conventionally on the order of 20–40 mils (0.05–0.10 cm). These coatings are frequently referred to as "roof mastics." Roof mastics are often applied by spray techniques which allow many acres of coating to be applied during a single work period. Because they are applied as a thick coating, they lose water by evaporation relatively slowly in comparison with other polymer latex coatings products such as house paints. Thus, roof mastics are particularly vulnerable to being washed out by unanticipated precipitation. A substantial need exists for water-based roof mastics and other exterior water-based coatings products which resist washout immediately after application or shortly thereafter ("early" washout resistance).

SUMMARY OF THE INVENTION

It is an object of the present invention to provide washout resistant exterior coatings. This invention advantageously provides coatings binders which may be used to formulate experior water-based coatings, including roof mastics, which quickly develop resistance to being washed away by precipitation. This invention permits coatings applicators to work despite weather forecasts which would rule out the application of prior art water-based coatings, increasing their productive time and the value of their capital equipment and labor. This invention also provides washout resistant water-based caulks and sealants. These and other objects and advantages, which will be understood from the disclosure below, are met by the present invention, which is an improved exterior coating composition displaying superior washout resistance comprising an aqueous dispersion of water-insoluble latex polymer prepared by emulsion polymerization, pigment dispersed with anionic polymer, and water-soluble salt of a multivalent complex ion having labile, volatile ligands, such as zinc ammonium complex ion.

This invention also provides a process for improving the washout resistance of roof mastics and other exterior coating compositions, including caulks. This process comprises adding an effective amount of a multivalent metal complex water-soluble salt to such coating compositions, or forming the same in situ, sufficient to reduce the time required for a newly applied composition to develop resistance to being washed out.

DETAILED DESCRIPTION OF THE INVENTION

The compositions of the present invention comprise an aqueous dispersion of water-insoluble latex polymer prepared by emulsion polymerization, pigment dispersed with anionic polymer, and water-soluble salt of a multivalent complex ion having labile, volatile ligands such as zinc ammonium complex ion.

The compositions of this invention are particularly useful as washout resistant coatings for exterior surfaces, especially when applied to horizontal or nearly-horizontal surfaces such as roofs over industrial, commercial and institutional buildings such as warehouses, factories, retail stores, hospitals, schools and the like. These compositions may be used to protect formed-in-place polyurethane foam coatings for existing roofs or they may be applied over built-up roofing formed from roofing felts and asphat or tar. For a general description of elastomeric roof mastics, see Rohm and Haas Company publication 83E4 (February 1982) "The Elastomeric Roof Market 1981" and L. S. Frankel et al., "Extending the Line of Acrylic Binders for Elastomeric Roof Mastics," *Resin Review* V.32 (No. 4, 1983). In addition, when formulated at appropriate pigment-to-binder ratios and with appropriate rheology-controlling additives, as are well known in the coatings art, these compositions may be employed as latex caulks and sealants.

The compositions of the present invention exhibit superior washout resistance; that is, they resist washout by rain or by other natural or simulated precipitation more quickly after application of the coating or caulking composition than prior art compositions. It is believed that this early washout resistance is the result of multivalent metal ion precipitation of the anionic polymers used to disperse pigments and that the multivalent metal ions become available for such precipitation as the complex metal ion is shifted through the various equilibria linking it to metal ion. The ligand, for example, is believed to be lost at the surface of the applied coating or caulk to the atmosphere. However, this invention is not limited to this or any other explanation or theory thereof.

Zinc ammonium complex ion is a well-known crosslinking agent for polymeric binders bearing carboxylate groups and it is unavoidable that some such crosslinking occur when ammonium is given up by the compositions of the present invention which may contain polymer latex binder with carboxylate functionality. However, the presence of such polymer latex in the coating composition is not a necessary condition for these compositions to achieve early washout resistance, and carboxylate free binders may be used.

The compositions of the present invention require water-soluble salt of complex ion of a multivalent metal ion selected from the alkaline earth and transition metal ions and a ligand selected from ammonia and the organic amines. The ligand must be chosen so that when it is dissociated from the metal ion, or partially dissociated metal complex, the ligand molecule is relatively volatile. In addition, the rate constant for dissociation of the complex ion into metal ion or partially dissociated metal complex and ligand molecule must be relatively large. When these two conditions are met, a relatively rapid shift in the equilibrium between the complex ion and the metal or partially dissociated metal complex and the ligand molecule occurs when the roof mastic is applied to the substrate. On application of the roof mastic, it is believed that the large surface area exposed to the atmosphere permits the relatively volatile ligand to escape from the roof mastic composition into the environment. The relatively large rate constant for dissociation of the metal complex assures the continued dissociation of the complex and replenishment of the pool of ligand molecules dissolved in the roof mastic solvent near the surface exposed to the atmosphere, which in turn continues to lose ligand molecules to the environment. As the concentration of metal complex ion decreases in the roof mastic, it is believed that the concentration of metal ion increases, eventually achieving a concentration effective to destabilize and precipitate the anionic polymers used as pigment dispersants in the roof mastic. Metal ions which may be useful include: $Zn(II)$, $Zr(II)$, $Fe(II)$, $Fe(III)$, $V(III)$, $VO(II)$, $Co(II)$, $Mn(II)$, $Ca(II)$, $Mg(II)$, $Ba(II)$, $Sr(II)$, $Cd(II)$, $Cu(II)$ and $Pb(II)$. $Zn(II)$ is preferred. Ligands which may be useful include: ammonia, methylamine, dimethylamine, trimethylamine, ethylamine, isopropylamine and n-propylamine. Other volatile amines may also be used. Ammonia is preferred. Zinc ammonium bicarbonate may be used. However, any other water soluble salt of the multivalent metal complex ion, such as zinc ammonium acetate or zinc ammonium nitrate, may also be used. In addition, mixtures of water-soluble multivalent metal complex salts, such as zinc ammonium complex salts, may be used.

It is often convenient to dissolve the water-soluble salt in water prior to addition to the coating composition. Such solutions may also contain excess ammonia. The water-soluble salt of multivalent metal complex ion may be mixed with the aqueous dispersion of water-insoluble polymer latex which serves as the coating or caulk binder. The polymer latex dispersion containing the added salt may be used subsequently to prepare roof mastics, caulks, or other coating compositions. Alternative methods of incorporating the multivalent metal complex will be readily apparent to those skilled in the coatings formulation art.

The amount of multivalent metal complex salt required to be added to yield an improvement in the early washout resistance of the exterior coating, roof mastic, caulk or sealant composition depends on the amount of anionic pigment dispersant employed in preparing the composition, which in turn depends on the amount and type of pigment employed. The minimum level required for a particular composition may be easily determined by the coatings chemist through routine experimentation. As a guide, it is observed that a significant increase in early washout resistance may be obtained in some roof mastic compositions when complex salt is added at a level sufficient to give approximately one equivalent of complex ion per equivalent of anionic change on the polymeric dispersant.

The aqueous dispersions of water-insoluble latex polymer used in the compositions of the present invention are prepared by emulsion polymerization. Emulsion polymerization techniques are well known to the art, and are discussed in detail in D. C. Blackey, *Emulsion Polymerization* (Wiley, 1975). Any monomer mixture which yields water-insoluble polymer latex which is dispersible in water may be used to prepare the latex polymers of the present compositions. For example, vinyl acetate, which itself has appreciable water-solubility as a monomer, may be employed, as homopolymers of vinyl acetate are water-insoluble. Acrylic monomers such as the alkyl esters of acrylic acid and methacrylic acid are preferred. Examples of acrylic monomers which may be used to prepare the latex polymers of the present invention include the $(C_1-C_8)$alkyl esters of acrylic acid and the $(C_1-C_8)$alkyl esters of methacrylic acid, such as methyl methacrylate, methyl acrylate, ethyl acrylate, ethyl methacrylate, n-butyl methacrylate, n-butyl acrylate, 2-ethylhexyl acrylate, n-octyl acrylate, sec-butyl acrylate, isobutyl methacrylate, and cyclopropyl methacrylate.

Minor amounts of alpha, beta-ethylenically unsaturated monomers with appreciable water-solubility, such as acrylic acid, methacrylic acid, itaconic acid, citraconic acid, acrylamide and methacrylamide, may also be used in preparing the emulsion polymers used in the compositions of the present invention. As is well known in the art, the copolymerization of such water-soluble monomers with water-insoluble monomers often confers desirable properties upon the resulting copolymer, such as long-term latex stability, dispersability, increased adhesion to specific substrates, and the like.

Acidic monomers which may be used in preparing the emulsions employed in the instant invention are alpha, beta-monoethylenically unsaturated acids such as maleic, fumaric, aconitic, crotonic, citraconic, acryloxyproprionic and higher oligomers of acrylic, acrylic, methacrylic, and itaconic acids.

Further examples of acidic monoethylenically unsaturated monomers may be copolymerized to form the water-insoluble addition polymers of the instant invention are partial esters of unsaturated aliphatic dicarboxylic acids and particularly, the alkyl half esters of such acids. Examples of such partial esters are alkyl half esters of itaconic acid, fumaric acid, and maleic acid wherein the alkyl group contains 1 to 6 carbon atoms. Representative numbers of this group of compounds include methyl acid itaconate, butyl acid itaconate, ethyl acid fumarate, butyl acid fumarate, and methyl acid maleate.

The emulsion polymers may contain alpha, beta-ethylenically unsaturated aromatic monomer, such as styrene, vinyl toluene, 2-bromo-styrene, o-bromo-styrene, p-chloro-styrene, o-methoxy styrene, p-methoxy-styrene, allylphenyl ether, allyltolyl ether, and alphamethyl styrene.

The emulsion polymers of this invention may contain polar or polarizable nonionogenic hydrophilic monomer, such as acrylonitrile, methacrylonitrile, cis- and trans-crotonitrile, alpha-cyanostyrene, alpha-chloroacrylonitrile, ethyl vinyl ether, isopropyl vinyl ether, isobutyl vinyl ether, and butyl vinyl ether, diethylene glycol vinyl ether, decyl vinyl ether, vinyl acetate, hydroxyalkyl(meth)acrylates, such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, 2-hydroxypropyl methacrylate, and vinyl thiols such as 2-mercaptopropyl methacrylate, 2-sulfoethyl methacrylate, methyl vinyl sulfide, and propyl vinyl sulfide.

The emulsion polymers of the instant invention may contain monomeric vinyl ester in which the acid moiety of the ester is selected from the aromatic and ($C_1$–$C_{18}$) aliphatic acids. Examples of such acids include formic, acetic, propionic, n-butyric, n-valeric, palmitic, stearic, phenyl acetic, benzoic, chloroacetic, dichloroacetic, gamma-chloro butyric, 4-chlorobenzoic, 2,5-dimethylbenzoic, o-toluic, 2,4,5-trimethoxy benzoic, cyclobutane carboxylic, cyclohexane carboxylic, 1-(p-methoxy phenyl)cyclohexane carboxylic, 1-(p-tolyl)-1-cyclopentane carboxylic, hexanoic, myristic, and p-toluic acids.

The monomer mix may also include multifunctional monomers such as allyl methacrylate, divinyl benzene, diethylene glycol dimethacrylate, ethylene glycol dimethacrylate, 1,6-hexanediol diacrylate, 1,3-butylene glycol dimethacrylate, trimethylol propane triacrylate, trimethylol propane trimethacrylate, and the like.

Conventional emulsion polymerization techniques may be used to prepare the polymers employed in the compositions of this invention. Thus, the monomers may be emulsified with an anionic or nonionic dispersing agent, about 0.5% to 10% thereof on the weight of total monomers can be used. Acidic monomers are water soluble and thus serve as dispersing agents which aid in emulsifying the other monomers used. A polymerization initiator of the free radical type, such as ammonium or potassium persulfate, may be used alone or in conjunction with an accelerator, such as potassium metabisulfite or sodium thiosulfate. The initiator and accelerator, commonly referred to as catalysts, may be used in proportions of 0.5% to 2% each based on the weight of monomers to be copolymerized. Thermal and redox processes may be used. The polymerization temperature may be from room temperature to 90° C., or more, as is conventional. Batch, gradual addition, continuous and multiple stage processes may be used.

Examples of emulsifiers which are suited to the polymerization process of emulsions used in the present invention include alkaline metal and ammonium salts of alkyl, aryl, alkaryl, and aralkyl sulfonates, sulfates, and polyether sulfates; the corresponding phosphates and phosphonates; and alkoxylated fatty acids, esters, alcohols, amines, amides; and alkylphenols.

Chain transfer agents, including mercaptans, polymercaptans, and polyhalogen compounds are often desirable in the polymerization mixture to control polymer molecular weight.

Suitable polymer latex binders are available commercially from a number of vendors.

The relative amount of polymer latex used in the compositions of the present invention depends on the desired application. In general, the weight ratio of inorganic pigment to binder may be from 1/1 to about 5/1, preferably about 1/1 to 4/1. In the case of roof mastics, a pigment-to-binder ratio of from about 1/1 to 3/1 may be used with a ratio of about 2/1 preferred. It is desirable to maintain the pigment volume concentration below the critical pigment volume concentration, as is well known in the coatings art.

For aqueous latex based mastics, caulks, or sealants of the present invention, the total solids content may be from about 50% to about 90% by weight, preferably from about 60% to about 85%. Solids content is kept as high as possible while yet achieving a useful consistency.

As used in the instant specification and claims, the word "pigment" denotes both inorganic materials which are used to impart aesthetic and functional qualities such as rutile and anatase titanium dioxide, and inorganic materials which are used to fill the compositions, such as calcium carbonate ("fillers").

The pigments are present in an amount of from 10 percent to 90 percent by weight of the total solids in the composition depending upon the consistency desired, the presence or absence of thickening agents, the amount and identity of solvent utilized, and so forth. Suitable pigments include rutile and anatase titanium dioxide, calcite, limestone, mica, talc, asbestos fiber or powder, diatomaceous earth, barytes, alumina, slate flour, calcium silicate, clay, colloidal silica, magnesium carbonate, magnesium silicate, zinc oxide and so on. The amounts of solvent, if any, pigment, and polymer solids are such as to give caulking compositions a dough-like consistency. Roof mastics have a somewhat thinner consistency with viscosity approximately 80–120 K.U.

The pigment used in the compositions of this invention is dispersed using high speed dispersion equipment such as a Cowles disperser. Anionic polymer, such as polyacrylate or polyphosphate is used as a dispersing aid and in stabilizing the dispersion. Copolymers of acrylic acid and/or methacrylic acid with lower alkyl acrylates are preferred as dispersants. In another preferred embodiment, potassium tripolyphosphate is used to disperse the inorganic pigments. The amount of dispersant used depends on the surface area of the pigment employed per unit volume of the composition. The amount is easily determinable by those skilled in the coatings art by conventional techniques.

The anionic dispersants which may be used are anionically charged polymeric materials used to disperse the inorganic materials used to pigment or fill the coating, roof mastic, caulk or sealant compositions of the present invention. Sodium tripolyphosphate (CAS Reg. No. 7758-29-4) is a preferred anionic dispersant as is potassium tripolyphosphate. Polyacrylates are also prefereed dispersants, and the combination of polyacrylates and polyphosphates are especially preferred. Other types of "condensed" phosphates, that is, dehydrated polymerized orthophosphate in which the $H_2O$ to $P_2O_5$ ratio is less than 3 to 1, may be used. Sulfonated polymers, including naphthalene-formaldehyde sulfonated polycondensates, polymaleates, natural product-derived dispersants, such as tannins, lignins, alginates, gluconates, glucosides, organic phosphonates including methylene phosphonates, may be used. The particular type and amount of dispersant employed may depend on the pigment types and grades selected, and particular grades of certain pigments, for example, titanium dioxide, are available commercially in predispersed form.

The pH of the compositions of the present invention must be adjusted so that it is high enough to prevent premature gellation, as during storage. The minnimum acceptable pH can be determined by routine experimentation. As a guide, it is found that roof mastics prepared according to the formulation given below are stable when the pH is about 10.0 or above; preferably the pH is about 10.3 or greater. Washout resistance may not be obtained in some formulations with an initial pH of 9.5.

The compositions of the present invention may be thickened using conventional coatings thickeners as desired. For example, cellulosic thickeners such as methyl cellulose and hydroxyethyl cellulose may be used. Other types of thickeners and rheology modifiers, such as associative hydrophobic alkali soluble emulsions may also be used. The amount of thickener employed depends on the type of coatings product to be prepared, the pigment/binder ratio of the composition, the type and grade of thickener used, the application technique to be used, etc.

The compositions of the present invention may also include conventional coatings ingredients such as can preservatives, antimicrobial agents, mildewicides, antifreeze agents, coalescents, defoaming agents, colorants, dyes, cosolvents, plasticizers and adhesion promoters.

A variety of application techniques may be employed with the compositions of the present invention. To some extent, the application technique depends on the viscosity and rheology of the composition. The roof mastics of the present invention have a viscosity which is somewhat greater than exterior latex paints and they are conventionally applied by spray techniques such as by airless spray. Other techniques, such as application by brush, roller, electrostatic spray, etc., may also be used as appropriate. Caulks may be applied by gunning.

TEST METHODS

Washout Resistance-Roof Mastics

Coatings of roof mastic twenty mils (0.01 cm) thick (wet) are prepared on aluminum plates approximately three by six inches (7.6 cm × 15.2 cm). The coatings are dried at approximately 50% relative humidity, 72° F. (22° C.) for various times beginning at five minutes and at five or ten minute-increments thereafter. This is done by preparing five coatings at one time, then selecting and testing a coating having the desired dry time as the coatings dried. At each dry time the coatings are subjected to a fine spray of water from a hand-powered household sprayer. The spray is repeated at thirty second intervals for a total of ten times. A coating is considered to pass the test (have good washout resistance) at a given dry time if water running from the coating contains no white redispersed coating after it has been sprayed ten times. A coating is considered to fail the test (have poor washout resistance) at a given dry time if water running from the coating contains white redispersed coating after any one of the ten water sprays.

Washout Resistance-Caulks

Slabs of caulk 125 mils (0.32 cm) thick (wet) and having dimensions of 1 inch by 3½ inches (2.5 cm × 8.9 cm) are prepared on aluminum plates approximately 3 by 6 inches (7.6 cm × 15.2 cm). The caulk slabs are dried at approximately 50% relative humidity, 72° F. (22° C.) for various times beginning at five minutes, then ten minutes, fifteen minutes, and at fifteen minute increments thereafter. This is done by preparing several slabs at a time then selecting and testing a coating having the desired dry time as the coatings dry. At each dry time, the aluminum plate bearing the caulk slab is totally immersed in water for twenty-four hours and then rated for resistance to redispersion. A caulk slab is considered to "pass" the test when it resists redispersion for twenty four hours.

Consistency-Caulks

A sample of compound and a 6-ounce-polyethylene cartridge are conditioned for at least 16 hours at standard conditions. At the end of the conditioning period the cartridge with plunger in place is filled to capacity with compound from the nozzle end, and placed in an air-powered caulking gun (Semco Sales & Service, Inc.). A standard Semco nozzle with a ⅛-inch diameter orifice is attached to the cartridge. The compound is then gunned at 50 psi pressure into an empty container while a stopwatch is used to time the extrusion through the orifice. Gunning time is recorded in seconds.

The present invention is illustrated by, but in no way limited, by the following examples.

Preparation of the Latex Polymer

Polymer A is prepared by emulsion polymerization using standard techniques. The resulting aqueous dispersion of latex polymer has total solids of 55% and the following monomer composition by weight: Butyl acrylate, 96.35%; acrylonitrile, b 2%; methacrylic acid, 1.65%. The polymer is prepared by the gradual addition of an anionic surfactant-stabilized monomer emulsion to a seed emulsion at 80°–82° C. Free radical polymerization is catalyzed by $Na_2S_2O_8$ cofeed during polymerization. The resulting polymer latex is chased with redox catalyst to reduce residual monomer.

Roof Mastic Preparation

Roof mastics are prepared using standard coatings techniques according to Formulation I below.

| Roof Mastic Formulation I | | |
|---|---|---|
| Ingredient | Function | Weight (g) |
| Water | carrier | 178.1 |
| Hydroxyethyl cellulose (Natrosol ® 250 MXR[1]) | thickener | 4.4 |
| Anionic polymer (Tamol ® 850[2]) | dispersant | 5.0 |
| Ethylene glycol | coalescent | 15.6 |
| Nopco ® NXZ[3] | defoamer | 2.0 |
| KTPP | polyphosphate dispersant | 1.5 |
| Calcium carbonate (Duramite ®[4]) | filler pigment | 443.4 |
| Zinc oxide (Kadox ® 515[5]) | reactive pigment/stabilizer | 49.3 |
| Titanium dioxide TiPure ® R-960[6] | hiding/reflective | 73.9 |

[1]Natrosol ® is a registered trademark of Hercules, Inc., Wilmington, DE.
[2]Tamol ® is a registered trademark of Rohm and Haas Co. Tamol ® 850 dispersant is a sodium salt of a carboxylated polyelectrolyte.
[3]Nopco ® is a registered trademark of Diamond Shamrock Corp.
[4]Duramite is a trademark of Thompson-Weiman & Co., Cartersville, GA.
[5]Kadox ® is a registered trademark of New Jersey Zinc, Bethlehem, PA.
[6]TiPure ® is a registered trademark of E. I. DuPont deNemours Co.

The ingredients above are combined and ground for 15 minutes on a high speed dispenser. The grind is let down at low speed with the following ingredients:

| Ingredient | Function | Weight (g) |
|---|---|---|
| Polymer A 55% total solids | binder | 431.4 |
| Texanol ®[7] | coalescent | 7.3 |
| Skane ® M-8[8] | mildewicide | 2.2 |
| Nopco ® NXZ[3] | defoamer | 2.0 |
| Triton ® X-405[9] | nonionic surfactant | 5.5 |
| NH4OH | adjust pH | 1.0 |

| -continued | | |
|---|---|---|
| Ingredient | Function | Weight (g) |
| Water | | 41.1 |

[7]Texanol ® is a registered trademark of Eastman Kodak, Rochester, NY
[8]Skane ® is a registered trademark of Rohm and Haas Company.
[9]Triton ® is a registered trademark of Rohm and Haas Company. Triton X-405 surfactant is at octylphenol polyether alcohol, CAS Reg. No. 9036-19-5.

Caulk Preparation

Caulks are prepared using standard coatings formulation techniques according to Formulation II below.

| Caulk Formulation II | | |
|---|---|---|
| Ingredient | Function | Weight (g) |
| Polymer A | binder | 522.20 |
| Antimicrobial (Proxel CRL[1]) | preservative | .11 |
| Triton ® X-405[2] | nonionic surfactant | 10.50 |
| Ethylene glycol | coalescent | 2.90 |
| Hydroxyethyl cellulose (Natrosol ® 250 MXR[3]) | thickener | 5.80 |
| Sodium polyphosphate (Calgon ® T[4]) | pigment dispersant | 6.30 |
| Tamol ® 850[5] | pigment dispersant | 1.50 |
| Calcium Carbonate (Camel Tex[6]) | pigment | 734.60 |
| Titanium dioxide (TiPure ® R-901[7]) | pigment | 16.50 |
| The ingredients above are added to a sigma-blade mixer and mixed at high shear for 75 minutes. The following ingredients are then added and mixing is continued for an additional 10 minutes. | | |
| Mineral thinner (Varsol No. 1[8]) | cosolvent | 29.60 |
| Silane 7-6040[9] | glass adhesion promoter | 0.42 |
| Finally, the following defoamer is added and mixing is continued for an additional 5 minutes to reduce entrained air. | | |
| Nopco ® NXY[10] | | 1.10 |

[1]Proxel CRL microbiocide is a product of ICI Americas, Wilmington, DE.
[2]Triton ® X-405 surfactant is an octylphenol polyether alcohol.
[3]Natrosol ® is a registered trademark of Hercules, Inc., Wilmington, DE.
[4]Calgon ® is a registered trademark of PPG, Inc., Pittsburgb, PA.
[5]Tamol ® is a registered trademark of Rohm and Haas Co., Philadelphia, PA.
[6]Camel Tex is a trademark of Harry T. Campbell Sons' Corporation, Towson, MD. Camel Tex extender pigment has an oil absorbtion index of 13–16 and an average particle diameter of 2–5 microns.
[7]TiPure ® is a registered trademark of E. I. DuPont deMours Co.
[8]Varsol is a trademark of Exxon Corp., Houston, TX.
[9]Silane Z-6060 is a product of Dow Corning Corporation, Midland, MI.
[10]Nopco ® is a registered trademark of Diamond Shamrock Corp.

Preparation of Zinc Ammonium Complex Solutions

Solutions of soluble zinc ammonium complexes are prepared according to the following formulae:

| Zinc ammonium bicarbonate (8.4% zinc) | |
|---|---|
| Water | 2.80 g |
| Ammonium bicarbonate | 74.4 g |
| Zinc oxide | 62.0 g |
| Ammnonium hydroxide | 176.0 g |
| Zinc ammonium acetate (8.42% zinc) | |
| Water | 21.8 g |
| Zinc acetate (dihydrate) | 28.2 g |
| Ammonium hydroxide | 50.0 g |
| Zinc ammonium nitrate (8.4% zinc) | |
| Zinc nitrate (hexahydrate) | 40.3 g |
| Ammonium hydroxide | 59.7 g |

COMPARATIVE EXAMPLE 1

A roof mastic is prepared according to Roof Mastic Formulation I above. The resulting mastic has an initial consistency of 89 K.U. (Krebs Units) measured on a Stormer viscometer and requires 80 minutes dry time to develop washout resistances using the test method described above. The consistency after 30 days at 50° C. is 85 K.U. The long dry time to develop washout resistance is typical of aqueous roof mastics prepared and used heretofore.

EXAMPLE 1

A roof mastic is prepared according to Roof Mastic Formulation I above except that 41.1 g of water is replaced with 41.1 g of zinc ammonium bicarbonate solution. Preparation of this complex solution is described above. This roof mastic has an initial consistency of 88 K.U., a consistency after 30 days at 50° C. of 96 K.U., and requires 10 to 20 minutes dry time to develop washout resistance. This example illustrates the effect of added zinc complex on washout resistance of a roof mastic.

In the alternative, the metal complex may be generated in situ. For example, addition of ammonium bicarbonate and additional ammonium hydroxide to Roof Mastic Formulation I will result in formation of the zinc ammonium complex ion, as zinc oxide is already a component of the mastic formulation and is available as a source of zinc ions.

COMPARATIVE EXAMPLE 2

A roof mastic is prepared according to Roof Mastic Formulation I except that the Tamol ®850 dispersant content is 9.6 g and KTPP is omitted. The amount of Tamol ®850 dispersant is set to keep the number of equivalents of anionic dispersant the same as in Comparative Example 1. This roof mastic has a consistency of 89 K.U. and requires 80 minutes dry time to develop washout resistance. The consistency after 30 days at 50° C. is 90 K.U.

EXAMPLE 2

A roof mastic is prepared exactly as in Comparative Example 2 except that 41.1 g of water is is replaced by 41.1 g of zinc ammonium bicarbonate solution. This roof mastic has an initial consistency of 89 K.U. and requires 20 minutes dry time to develop washout resistance. The consistency after 30 days at 50° C. is 96 K.U. This example shows that early washout resistance can be obtained in a roof mastic containing only polycarboxylate pigment dispersant.

COMPARATIVE EXAMPLE 3

A roof mastic is prepared according to Roof Mastic Formulation I. The KTPP content is 3.1 g and Tamol ®850 dispersant is omitted. The amount of KTPP is set to keep the number of equivalents of anionic dispersant the same as in Comparative Example 1. This roof mastic has an initial consistency of 89 K.U. and requires 100 minutes dry time to develop washout resistance. The consistency after 30 days at 50° C. is 89 K.U.

EXAMPLE 3

A roof mastic is prepared exactly as in Comparative Example 3 except that 44.1 g of water is replaced by 41.1 g of zinc ammonium bicarbonate solution. This roof mastic has an initial consistency of 105 K.U. and requires 5 minutes dry time to develop washout resistance. The consistency after 30 days at 50° C. is 136 K.U. The higher initial consistency of this roof mastic may indicate marginal stability, as does the relatively large increase in viscosity during storage at elevated temperature. This example shows that early washout resistance can be produced in a roof mastic containing only a polyphosphate pigment dispersant.

COMPARATIVE EXAMPLE 4

A roof mastic was prepared exactly as in Example 1 except that only 10.3 g of water is replaced by zinc ammonium bicarbonate solution. This roof mastic has an initial consistency of 82 K.U. and requires 80 minutes dry time to develop washout resistance. The consistency after 30 days at 50° C. is 79 K.U. This comprative example shows that an amount of zinc complex only twenty-five percent of that of Example 1 is inadequate to improve washout resistance in the specific roof mastic formulation used in this case.

EXAMPLE 4

A roof mastic is prepared as in Example 1 except that only 15.5 g of water is replaced by zinc ammonium bicarbonate solution. This roof mastic has an initial consistency of 80 K.U. and requires 70 minutes dry time to develop washout resistance. The consistency after 30 days at 50° C. is 80 K.U. This example shows that an amount of zinc complex only thirty-seven and one half percent of that of Example 2 is inadequate to make a great improvement in washout resistance in this specific roof mastic formulation, although there is a small improvement.

EXAMPLE 5

A roof mastic is prepared as in Example 1 except that only 20.5 g of water is replaced by zinc ammonium bicarbonate solution. This roof mastic has an initial consistency of 84 K.U. and requires 50 minutes to develop washout resistance. The consistency after 30 days at 50° C. is 85 K.U. This example shows that the lower limit for zinc complex to produce a significant reduction in time to give improved washout resistance in this specific roof mastic formulation is approximately one-half equivalent based on anionic matter in the roof mastic.

EXAMPLE 6

A roof mastic is prepared exactly as in Example 1 except that 41.1 g of water is omitted and 82.2 g of zinc ammonium bicarbonate solution is added. This roof mastic has an initial consistency of 79 K.U. and requires 5 minutes dry time to develop washout resistance. The consistency after 30 days at 50° C. is 89 K.U. This example shows that an excess of zinc complex gives no improvement in washout resistance over that produced by equal equivalents of zinc and anions based on total anionic matter in the roof mastic.

EXAMPLE 7

A roof mastic was prepared exactly as in Example 1 except that 41.1 g of zinc ammonium nitrate solution is used instead of 41.1 g of zinc ammonium bicarbonate solution. This roof mastic has an initial consistency of 83 K.U. and requires 5 minutes dry time to develop washout resistance. The consistency after 30 days at 50° C. is 93 K.U. This example shows that other zinc ammonium complex salts can be substituted for zinc ammonium bicarbonate with retention of early washout resistance.

EXAMPLE 8

A roof mastic is prepared exactly as in Examples 1 and 7 except that 41.1 g of zinc ammonium acetate bicarbonate solution is used instead of 41.1 g of zinc ammonium bicarbonate or zinc ammonium nitrate solutions. This roof mastic has an initial consistency of 84 K.U. and requires 5 minutes dry time to develop washout resistance. The consistency after 30 days at 50° C. is 90 K.U. This example also shows that other zinc ammonium complex salts can be substituted for zinc ammonium bicarbonate with retention of early washing resistance.

COMPARATIVE EXAMPLE 5

A caulk is prepared according to Caulk Formulation II. The caulk has a measured consistency of 10.4 seconds and requires greater than 90 minutes to develop washout resistance.

EXAMPLE 9

A caulk is prepared according to Caulk Formulation II except that the level of cellulosic thickener is raised to 8.70 g to maintain caulk consistency approximately the same as that of Comparative Example 5 and that the following additional ingredients are added to the initial mix:

| | |
|---|---|
| Zinc oxide (Kadox ® 515) | 10.20 g |
| Ammonium bicarbonate | 12.20 |
| Ammonium hydroxide | 29.00 |

These components are added in the same ratio as is used to prepare solutions of the complex salt. Generation of the complex in situ rather than addition as a solution has the advantage of minimizing the reduction in caulk solids. This caulk has a consistency of 8.4 seconds and requires 5 to 10 minutes to develop washout resistance.

I claim:

1. An improved roof mastic or caulking composition displaying superior washout resistance comprising an aqueous dispersion of water-insoluble latex polymer prepared by emulsion polymerization, pigment dispersed with anionic polymer, and water soluble salt of zinc ammonium complex ion wherein the pigment to binder ratio of said roof mastic is from about 1.0 to 2.5.

2. A process for coating an exterior surface with a coating composition comprising an aqueous dispersion of a water-insoluble latex polymer prepared by emulsion polymerization and pigment dispersed with anionic polymer wherein the improvement comprises adding to the coating composition water soluble salt of zinc ammonium complex ion.

3. A process for caulking an exterior joint with a caulking composition comprising an aqueous dispersion of a water-insoluble latex polymer prepared by emulsion polymerization and pigment dispersed with anionic polymer wherein the improvement comprises adding to the coating composition water soluble salt of zinc ammonium complex ion.

4. The composition of claim 1 wherein the pH of the composition is at least about 10.0.

5. The composition of claim 4 wherein the pH of the composition is at least about 10.2.

6. The composition of claim 1 wherein the ration of equivalents of change of said zinc ion to the total equivalents of anionic change borne by said polymer dispersant is at least about 0.5.

7. The composition of claim 6 wherein said ratio of equivalents is from about 0.8 to 1.5.

8. The composition of claim 7 wherein the said ratio of equivalents is about unity.

9. The composition of claim 1 wherein said anionic polymer dispersant is polyphosphate, selected from copolymers of acrylic acid, and at least one monomer selected from the ($C_1$–$C_4$)alkyl acrylates, and mixtures thereof.

10. The composition of claim 9 wherein said anionic polymer is a mixture of potassium tripolyphosphate and copolymer of acrylic acid and at least one monomer selected from the ($C_1$–$C_4$)alkyl acrylates.

11. The composition of claim 1 wherein said water soluble salt of zinc ammonium complex ion is selected from zinc ammonium bicarbonate, zinc ammonium nitrate and zinc ammonium acetate.

* * * * *

UNITED STATES PATENT AND TRADEMARK OFFICE
CERTIFICATE OF CORRECTION

PATENT NO. : 4,571,415

DATED : February 18, 1986

INVENTOR(S) : Arthur D. Jordan, Jr.

It is certified that error appears in the above-identified patent and that said Letters Patent is hereby corrected as shown below:

Column 13, claim 9, line 2, change "polyphosphate, selected from" to -- selected from polyphosphate, --.

Signed and Sealed this

Second Day of February, 1988

Attest:

DONALD J. QUIGG

*Attesting Officer*      *Commissioner of Patents and Trademarks*